US009425733B2

(12) United States Patent
Habdank

(10) Patent No.: US 9,425,733 B2
(45) Date of Patent: Aug. 23, 2016

(54) SUPPORT STRUCTURE FOR SOLAR MODULES

(71) Applicant: Habdank PV-Montagesysteme GMBH & Co. KG, Goeppingen (DE)

(72) Inventor: Martin Habdank, Heiningen (DE)

(73) Assignee: HABDANK PV-MONTAGESYSTEME GMBH & CO. KG, Goeppingen (DE)

( * ) Notice: Subject to any disclaimer, the term of this patent is extended or adjusted under 35 U.S.C. 154(b) by 0 days.

(21) Appl. No.: 14/420,576

(22) PCT Filed: Jan. 19, 2013

(86) PCT No.: PCT/EP2013/000161
§ 371 (c)(1),
(2) Date: Feb. 9, 2015

(87) PCT Pub. No.: WO2014/026722
PCT Pub. Date: Feb. 10, 2014

(65) Prior Publication Data
US 2015/0288324 A1  Oct. 8, 2015

(30) Foreign Application Priority Data
Aug. 17, 2012  (DE) .................... 20 2012 103 108 U

(51) Int. Cl.
*H02S 20/30* (2014.01)
*E04B 1/36* (2006.01)
(Continued)

(52) U.S. Cl.
CPC ................. *H02S 20/30* (2014.12); *E04B 1/344* (2013.01); *E04B 1/34384* (2013.01); *E04B 1/36* (2013.01); *F24J 2/5207* (2013.01); *F24J 2/5232* (2013.01); *F24J 2/5264* (2013.01); *H02S 20/10* (2014.12); *F24J 2/5209* (2013.01); *F24J 2/541* (2013.01); *F24J 2002/5451* (2013.01); *Y02E 10/47* (2013.01)

(58) Field of Classification Search
CPC ......... H02S 20/30; H02S 20/10; E04B 1/344; E04B 1/34384; E04B 1/36
USPC ........................................... 52/173.3
See application file for complete search history.

(56) References Cited

U.S. PATENT DOCUMENTS 2,823,683 A * 2/1958 Smith et al. .................... 135/127
4,114,595 A * 9/1978 Barker .......................... 126/648
(Continued)

FOREIGN PATENT DOCUMENTS

DE   202009001983 U1   5/2009
DE   102008018422 A1   10/2009
(Continued)

OTHER PUBLICATIONS

International Search Report of PCT/EP2013/000161 Dated Sep. 24, 2013 With English Translation.

*Primary Examiner* — Brent W Herring
(74) *Attorney, Agent, or Firm* — FisherBroyles, LLP; Robert Kinberg

(57) ABSTRACT

The invention relates to a support structure for solar modules, with an arrangement of posts mounted on a base. A carrier unit is pivotably mounted on each post, the carrier unit having two struts supporting a crossbeam. The ends of the struts facing away from the crossbeam are mounted in a pivot bearing. The crossbeam is mounted on the post by guide means so as to be movable. Receiving means for mounting solar modules are provided on the crossbeam. The inclination of the solar modules is defined by adjusting and fixing a pivot position of the carrier unit.

6 Claims, 4 Drawing Sheets

Figure 1:
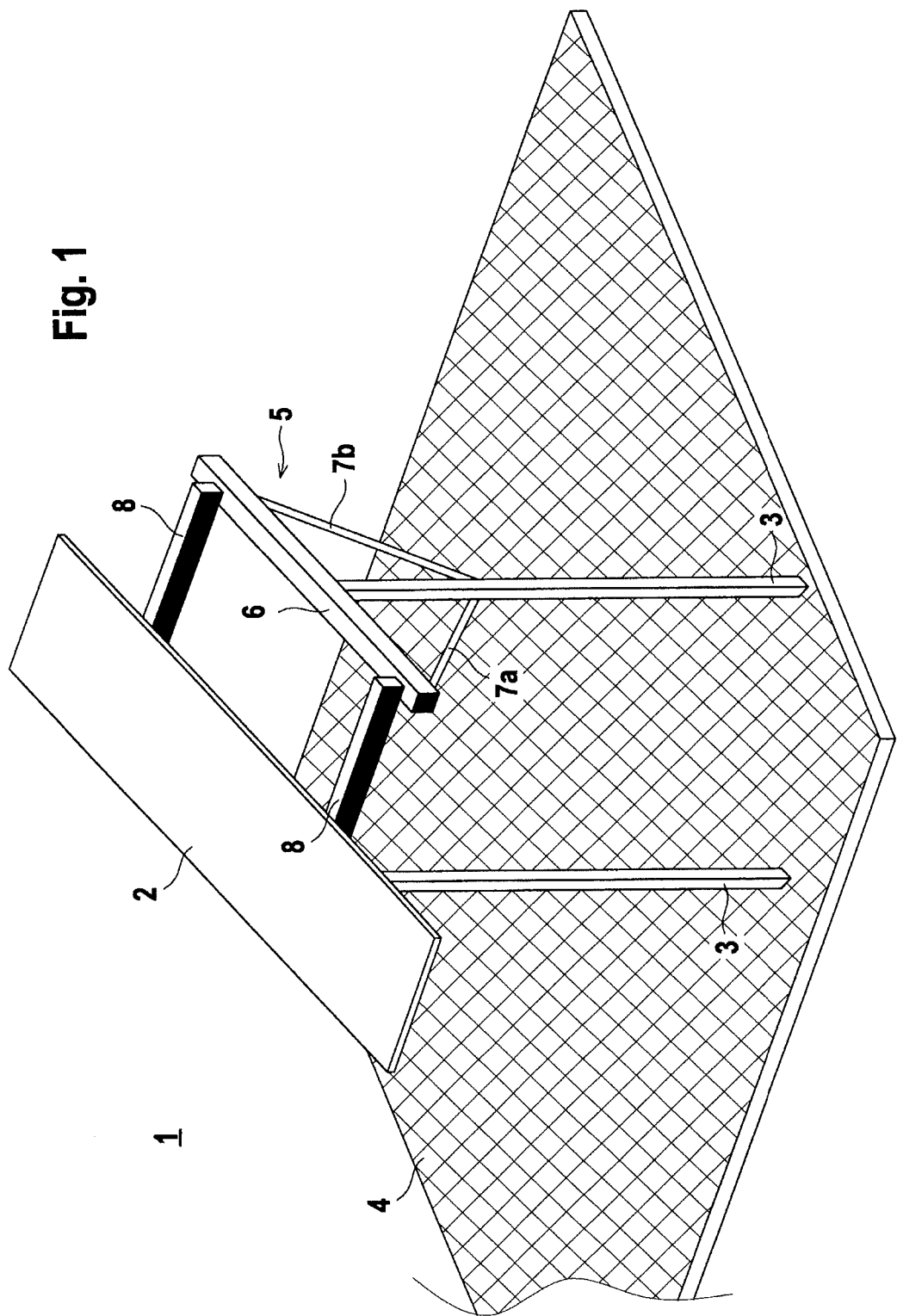

(51) Int. Cl.
    *E04B 1/344*     (2006.01)
    *H02S 20/10*     (2014.01)
    *E04B 1/343*     (2006.01)
    *F24J 2/52*     (2006.01)
    *F24J 2/54*     (2006.01)

(56) References Cited

U.S. PATENT DOCUMENTS

| | | | | |
|---|---|---|---|---|
| 5,205,073 | A * | 4/1993 | Lyons, Sr. | 49/386 |
| 6,367,212 | B1 * | 4/2002 | Manning | 52/232 |
| 6,499,266 | B1 * | 12/2002 | Macumber | 52/694 |
| 8,495,997 | B1 * | 7/2013 | Laubach | 126/680 |
| 8,550,419 | B2 * | 10/2013 | Hausner et al. | 248/370 |
| 8,832,938 | B2 * | 9/2014 | Gies et al. | 29/890.033 |
| 8,881,484 | B2 * | 11/2014 | Zante | 52/641 |
| 2010/0243827 | A1 * | 9/2010 | Zante et al. | 248/122.1 |
| 2011/0173900 | A1 * | 7/2011 | Plaisted et al. | 52/97 |
| 2012/0124922 | A1 * | 5/2012 | Cusson et al. | 52/173.3 |
| 2012/0222372 | A1 * | 9/2012 | Hilber | 52/173.3 |
| 2013/0075545 | A1 * | 3/2013 | Fischer | 248/122.1 |

FOREIGN PATENT DOCUMENTS

| | | |
|---|---|---|
| DE | 102011017467 B3 | 3/2012 |
| WO | WO-2011118754 A1 | 9/2011 |

* cited by examiner

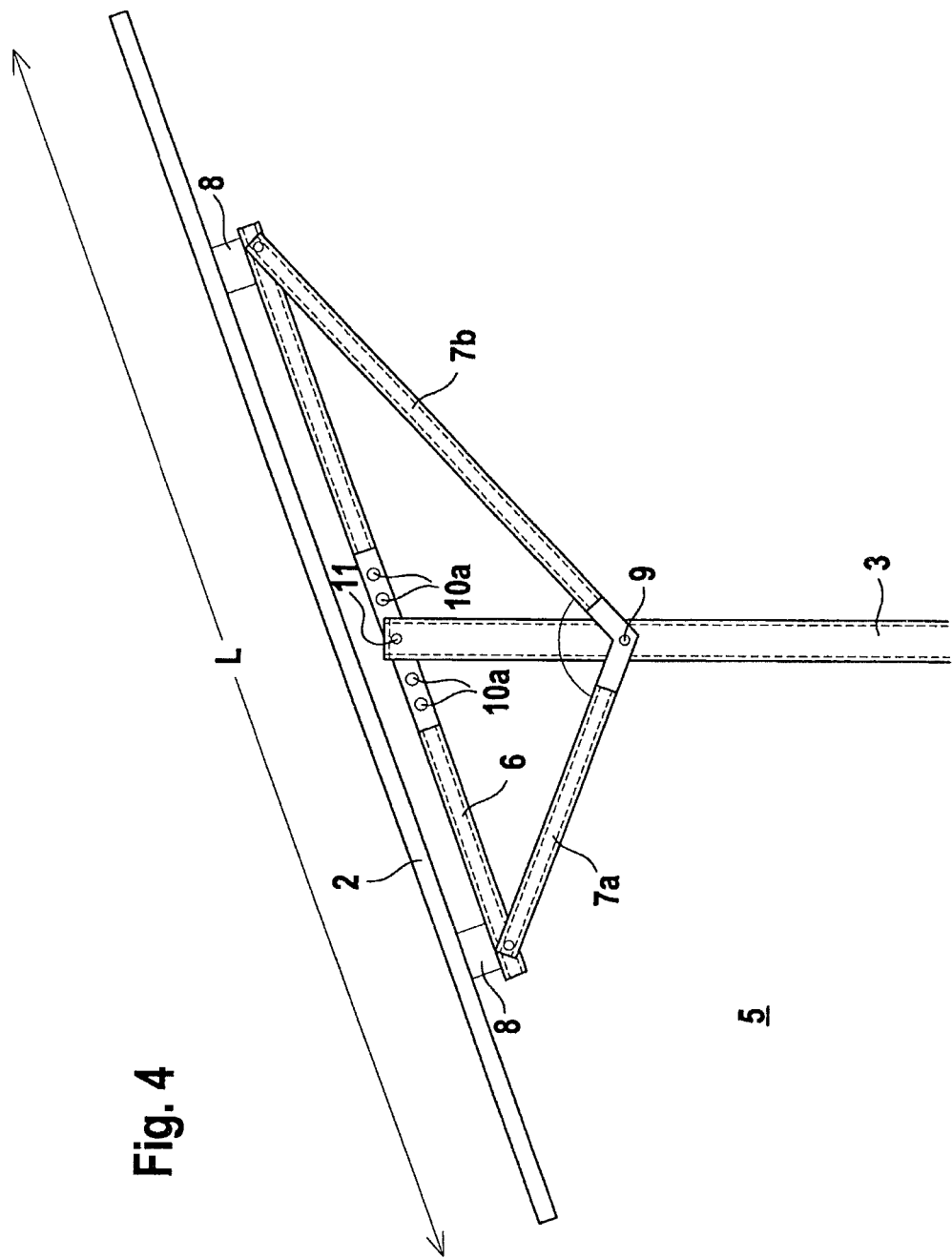

SUPPORT STRUCTURE FOR SOLAR MODULES

CROSS-REFERENCE TO RELATED APPLICATIONS

This application is a U.S. National Stage of International Application No. PCT/EP2013/000161, filed on Jan. 19, 2013, designating the United States and claiming priority to German Application No. 20 2012 103 108.6.

BACKGROUND OF THE INVENTION

The invention relates to a support structure for solar modules including an arrangement of posts mounted on a base.

Support structures of this type, provided with a plurality of solar modules and in particular photovoltaic modules, form solar systems which can be embodied in particular as ground-based systems for which posts are installed and especially pile-driven into the ground. Installed on these posts, which are typically arranged in a single row or in several rows, are carrier unit arrangements attached with the aid of fastening elements which carry solar modules mounted thereon.

Depending on the utilization, the carriers in the carrier arrangement must be mounted at different tilt angles or inclinations. For this, the support structure must be provided with a corresponding mechanism for changing the tilt angle.

A support structure of this type is known from German Patent document DE 10 2011 017 467 B3. This support structure for solar modules comprises an arrangement of carriers positioned on posts. Each carrier is connected with at least one fixed rod segment, which can be displaced axially and can be locked in place with a clamping sleeve, in that the rod segment is provided with a guide element on one longitudinal side end which engages in an elongated hole that extends in longitudinal direction of the carrier. Owing to the displacement of the rod segment, a combined height and tilt adjustment of the carrier can be realized.

One disadvantage of this arrangement is that an adjustment of the carrier tilt angle can be realized only in conjunction with a height adjustment. A further disadvantage is that the adjustment element for moving the rod segment is subjected to the full carrier load strain. On the one hand, this makes more difficult the tilt angle adjustment to be carried out while, on the other hand, it may result in stability problems due to the high load strain placed on the clamping sleeve.

German Patent document DE 10 2008 018 422 A1 relates to a system for installing pillars for ground-mounted photovoltaic systems, for which each pillar is provided with a support and a sloped beam as well as a strut for bracing the sloped beam against the support. The support, the sloped beam and the strut can be combined to form a fixedly adjustable pillar taking the form of a delta or triangular truss. A second hinged connection is provided for this between the sloped beam and the strut and a third hinged connection is provided between the strut and the support. The first hinged connection comprises a first joint approach, the second hinged connection comprises a second joint approach. The two joint approaches are arranged on the sloped beam, so as to be guided in longitudinal direction. The two joint approaches are guided non-rotating in longitudinal direction along the sloped beam and are fixedly attached thereon in the desired positions. The support can be connected via rotating joint to the first joint approach and the strut can be connected via rotating joint to the second joint approach.

To be sure, a tilt angle adjustment for the solar modules positioned on the pillars is possible with this arrangement, but it has a structurally quite involved configuration since three different joint connections are required for each pillar. In addition, longitudinally displaceable joint approaches must be provided for two joint connections, thus resulting in an undesirably high number of movable parts.

A further disadvantage of this arrangement is that the joint connections, arranged displaceable, are subjected directly to the full load strain exerted by the sloped beam and thereon positioned solar modules, thus making the adjustment operations considerably more difficult.

Yet another essential disadvantage is that the positions of the joint connections, arranged displaceable in longitudinal direction, must be computed and preset application-specific for the respective support geometry by an expert for planning support structures, which results in considerable construction and adaptation expenditure for each application-specific installation.

SUMMARY OF THE INVENTION

It is an object of the present invention to make available a support structure of the aforementioned type, which permits a secure and reliable tilt angle adjustment of solar modules at low structural expenditure.

The support structure according to the invention for solar modules comprises an arrangement of posts installed on a base. A carrier unit is positioned pivoting on each post, wherein the carrier unit is provided with two struts that support a crossbeam and wherein the strut ends that point away from the crossbeam are positioned in a pivot bearing. The crossbeam is positioned on the post, so as to be displaceable with guide means. Receiving means for positioning the solar modules are provided on the crossbeam. The tilt angle of the solar modules is preset through adjusting and fixing a pivot position for the carrier unit.

One advantage of the invention is that the struts together with the crossbeam form a universal structural unit, suitable for different applications, for which the tilt angle can be adjusted quickly and precisely through pivoting in the pivot bearing. A simple and reliable option is thus provided for adjusting the tilt angle of the solar modules positioned on these structural components. Since the same components in unchanged form and arrangement are always used for the tilt-angle adjustable structural unit with the struts and crossbeams, a considerable rationalization effect is achieved for the support structure according to the invention during its production.

Another advantage of the support structure according to the invention is that the struts of the support structure absorb the main load strain of the weight forces exerted from above, while the crossbeam for the most part is relieved of the load strain. During a tilt-angle adjustment for the most part only the crossbeam must be displaced with the aid of the guide means, meaning relative to the post. Since the crossbeam and the guide means must absorb hardly any weight forces, in contrast to the struts, an easy adjustment of the tilt angle is ensured.

A further advantage of the support structure according to the invention is that only the pivot bearing and the guide means for adjusting the crossbeam, relative to the post, need to be embodied as adjustable elements in order to realize the tilt-angle adjustment. The carrier unit, consisting of struts and posts, does not have to be equipped with adjustable elements. Rather, the complete carrier unit, as an unchangeable unit, is pivoted in the pivot bearing for a tilt-angle adjustment. It is therefore advantageous if the struts are attached fixedly, meaning rigidly, to the crossbeam, so that the carrier unit embodied in this way has a stable structural form. In principle, the struts could also be hinged to the crossbeam.

According to an embodiment of the invention, a longitudinal-side end of a support is connected to a longitudinal-side end of a crossbeam, wherein the supports converge at an obtuse angle toward the pivot bearing.

The carrier unit embodied in this way has a high stability, wherein the supports in particular can also absorb high forces.

According to another embodiment of the invention, the guide means are designed such that they can be used to preset continuously varying tilt angles for the solar modules.

In particular, an elongated hole is provided in the crossbeam and a pin guided inside this elongated hole is provided on the post for the guide means.

The guide means embodied in this way have a structurally simple design and permit a continuous displacement of the crossbeam, relative to the post, thereby also making possible a continuous adjustment of the tilt angle for the carrier unit.

To coordinate the pivot bearing and the guide means, the pivot bearing according to a first variant is embodied such that the support unit can pivot around a fixed point of the pivot bearing. In that case, the elongated hole in the crossbeam extends along a curved path.

This variant is distinguished by a simple design for the pivot bearing because the carrier unit in that case is rotated around a fixed pivot point of the pivot bearing.

The pivot bearing according to a second variant is embodied such that the ends of the struts which converge in the pivot bearing are moved along a path when the carrier unit is pivoted. In that case, the elongated hole in the crossbeam extends along a straight line.

The guide means in that case have a particularly simple design since the elongated hole in the crossbeam can extend along a straight line.

As alternative to the elongated-hole guidance, clamp slides or the like can also be provided as guide means, wherein these also permit a continuous tilt-angle adjustment.

According to an alternative embodiment, the guide means are designed such that they can be used to preset one or several discrete tilt angles for the solar modules.

As an alternative guide means, a single hole is worked application-specific into the crossbeam, the position of which defines the tilt angle of the crossbeam, and a pin for inserting into said hole is provided on the post.

To preset the desired tilt angle for this embodiment, adapted to the respective application, factory personnel will work only a single hole at the installation location into the support structure, using a suitable tool, at a desired position corresponding to the tilt angle.

The individual solar modules need not be mounted directly on the crossbeam. Rather, longitudinal members are positioned on the crossbeam, having longitudinal axes which usefully extend perpendicular to the longitudinal axes of the parallel arranged crossbeams. The solar modules can then be mounted directly on these longitudinal members. Alternatively, module carriers are mounted on the longitudinal member, with the solar modules attached thereto.

According to an embodiment, the longitudinal members may be positioned above the junctions, meaning the connecting points for the struts on the crossbeams. An optimized force flow thus results since the crossbeam for the most part remains free of bending moments and is only subjected to load strain. The struts are furthermore subjected only to mechanical strain or pressure. On the whole, a support structure is thus obtained which is maximally optimized with respect to material and costs.

BRIEF DESCRIPTION OF THE INVENTION

Figure 2:
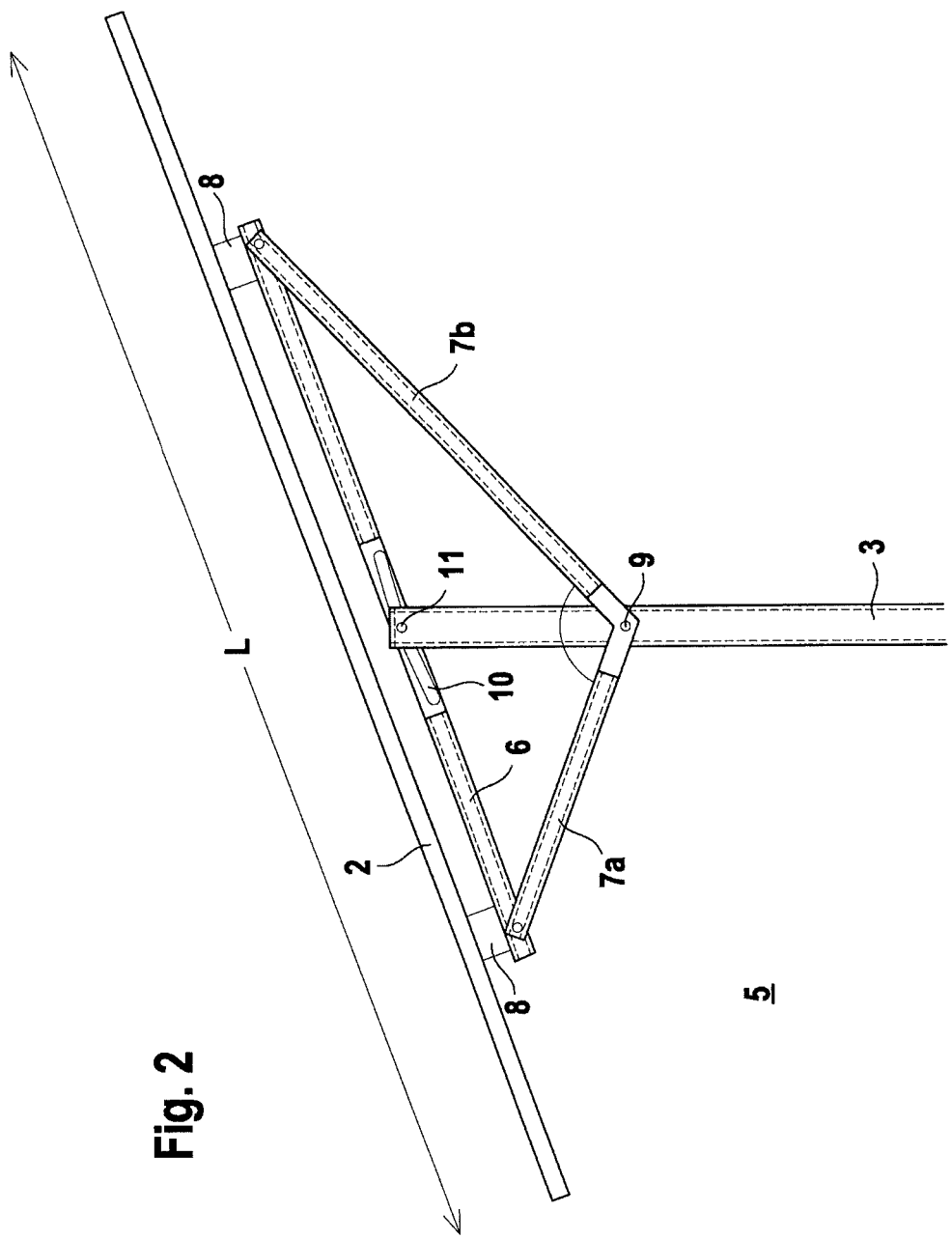
Figure 3:
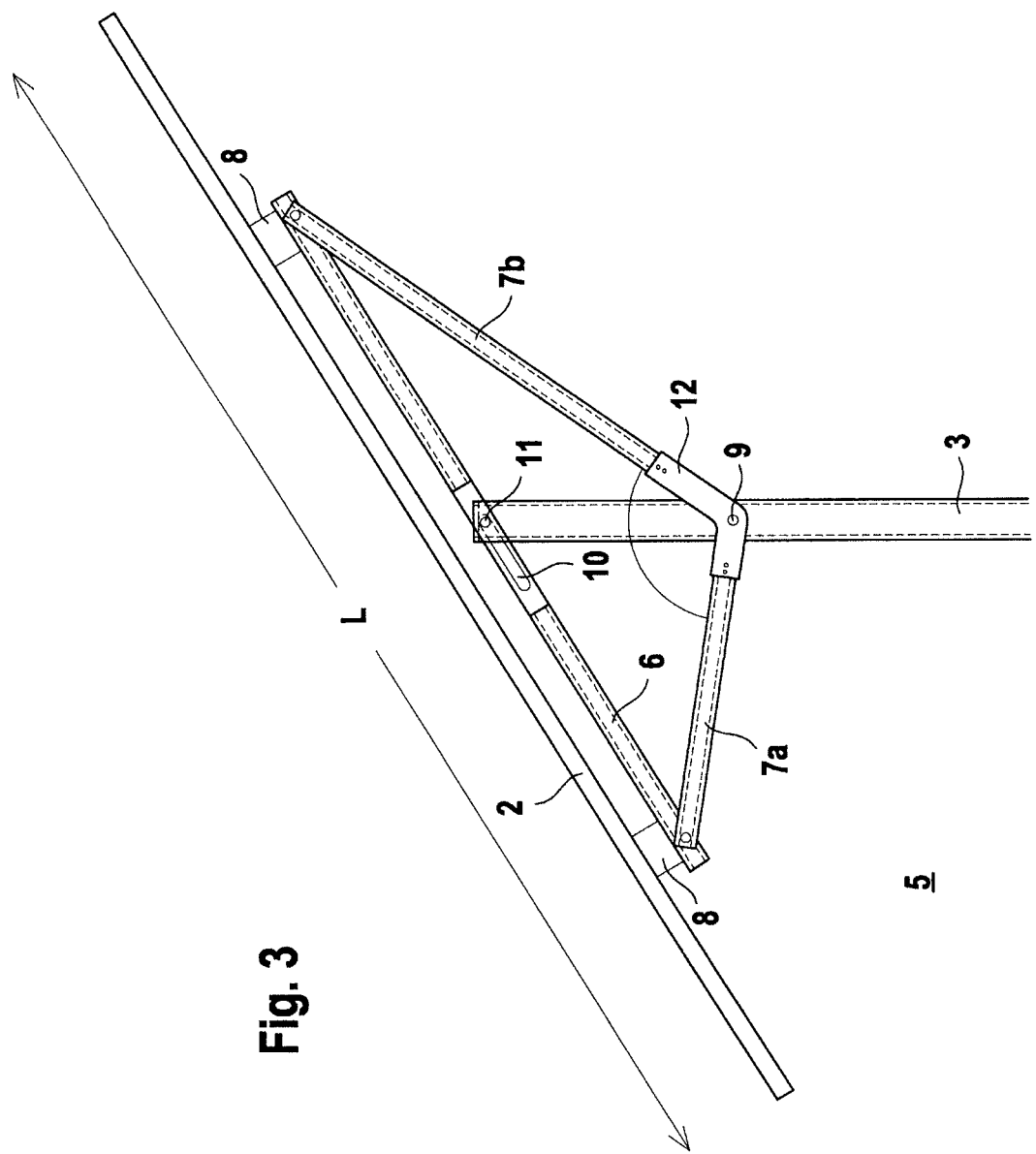

The invention is explained in the following with the aid of the drawings. Shown are in:

FIG. 1: A schematic representation of an exemplary embodiment of the support structure according to the invention for solar modules;

FIG. 2: A first exemplary embodiment of a carrier unit for the support structure according to FIG. 1;

FIG. 3: A second exemplary embodiment of a carrier unit for the support structure according to FIG. 1;

FIG. 4: A third exemplary embodiment of a carrier unit for the support structure according to FIG. 1.

DETAILED DESCRIPTION OF THE INVENTION

FIG. 1 schematically shows a segment of an exemplary embodiment of the support structure 1 according to the invention for solar modules 2. The support structure 1 with the solar modules 2 forms a ground-mounted system. The support structure 1 comprises a row of posts 3, arranged along a straight line, which are anchored in a base 4 with the longitudinal axes extending in vertical direction. The individual posts 3 are advantageously arranged equidistant. The individual posts 3 are embodied identical.

A carrier unit 5 is positioned pivoting and thus tilt-adjustable on each post 3. The carrier units 5, respectively embodied identical, are each provided with a crossbeam 6 and two struts 7*a*, 7*b* attached thereto. During the assembly of the support structure 1, the tilt angle for the crossbeams 6 is adjusted such that all crossbeams 6 are oriented at a preset, desired tilt angle. Mounted on the crossbeams 6, oriented in this way, are longitudinal members 8 for which the longitudinal axes extend perpendicular to the longitudinal axes of the crossbeams 6. In the present case, two parallel-extending longitudinal members 8 are provided on the crossbeam 6. The solar modules 2 for this embodiment are directly mounted on these longitudinal members 8. For this, respectively one solar module 2 rests on both longitudinal members 8. In general, several longitudinal members 8 can also be provided, so that several solar modules 2 are attached successively arranged on the longitudinal members 8, in the direction of the longitudinal axes of the crossbeams 6. It is furthermore possible to attach module carriers to the longitudinal members 8, on which the solar modules 2 are subsequently mounted.

FIG. 2 illustrates a first embodiment of a carrier unit 5 for a support structure 1 according to FIG. 1. As can be seen in FIG. 2, the longitudinal members 8, to which the solar modules 2 are then attached, are mounted in the area of the longitudinal-side ends of the crossbeam 6.

FIG. 2 shows that the lower portion of the solar module 2 projects over the lower longitudinal member 8 while the upper portion of the solar module 2 projects over the upper longitudinal member 8. For a particularly advantageous arrangement, the length of the central portion of the solar module 2 corresponds approximately to half the total length L of the solar module while the lengths of the solar module 2 portions that project upward and/or downward over the longitudinal members 8 respectively correspond to one fourth of the total length L of the solar module 2.

The carrier unit 5 forms a triangular structure, wherein the struts 7*a*, 7*b* are respectively attached with a longitudinal side end to a longitudinal side end of the crossbeam 6 and converge at an obtuse angle. The struts 7*a*, 7*b* in the present case are connected fixedly via suitable fastening means to the crossbeam 6, meaning the struts 7*a*, 7*b* form a rigid, form-stable structure together with the crossbeam 6. In principle, the struts 7a, 7b can also be connected articulated to the crossbeams 6. The first strut 7a in the present case is shorter than the second strut 7b, thus ensuring that the carrier unit 5 is already adapted to a desired tilt angle range for the crossbeam 6.

The exposed ends of the struts 7a, 7b that face away from the crossbeam 6 are rigidly connected to each other and are positioned pivoting with the aid of a pivot bearing on the post 3. In the present case, the pivot bearing is a bolt 9 or the like that is anchored to the post 3. The carrier unit 5 is thus positioned pivoting on the post 3, relative to a fixed axis of rotation which is the longitudinal axis of the bolt 9.

Guide means on the crossbeam 6 and the post 3 provide a further connection between the carrier unit 5 and the post 3. These guide means involve an elongated hole or opening 10 in the crossbeam 6 and a pin 11 or the like that is guided inside the elongated hole 10 in the crossbeam 6 on the post 3.

The width of the elongated hole 10 and the diameter of the pin 11 with circular cross section are adapted to each other in such a way that the pin 11 is guided with little play inside the elongated hole 10. The elongated hole 10 does not extend along a straight line, but along a curved path. The curvature of the path is adapted to the curvature of the path taken by the crossbeam 6 during the pivoting of the carrier unit 5, relative to the axis of rotation for the pivot bearing, so that the pin 11 is guided centrally in the elongated hole 10 during the pivoting positioning and does not hit the side edges.

To adjust the tilt angle, the complete carrier unit 5 is pivoted relative to the pivoting axis for the pivot bearing, such that the crossbeam 6 is displaced relative to the post 3 and the pin 11 is consequently guided inside the elongated hole 10. The size of the elongated hole 10 determines the range for the tilt-angle adjustment. As soon as the tilt angle has been adjusted, this setting is fixed, wherein suitable fastening means are provided for this in the area of the pivot bearing and/or in the area of the guide means.

FIG. 3 shows a variant of the embodiment according to FIG. 2. The embodiment shown in FIG. 3 differs from the exemplary embodiment shown in FIG. 2 only with respect to the designs for the guide means and the pivot bearing. In the present case, the ends of the struts 7a, 7b that are facing away from the crossbeam 6 converge to form a rocker 12. This rocker 12 not only can be pivoted on the bolt 9, but can additionally also be displaced along a curved path during the pivoting movement. This displacement movement achieves that during the pivoting of the carrier unit 5, the crossbeam 6 moves only in the direction of its longitudinal axis, so that the elongated hole 10 in the crossbeam 6, in which the pin 11 is guided, in this case extends along a straight line.

FIG. 4 shows a different embodiment of the carrier unit 5 according to FIG. 2. The arrangement according to FIG. 4 differs from the arrangement shown in FIG. 2 only in that a discrete series of individual holes 10a is provided in place of the elongated hole 10. The holes 10a are identical in size, so that the pin 11 can be guided with little play in the holes 10a. The holes 10a permit a discrete tilt-angle adjustment of the solar modules 2. In order to preset a tilt angle, the pin 11 is inserted into one of the holes.

The crossbeam for the present case is provided with five elongated holes 10a. In general, however, a different number of holes 10a can also be used. In borderline cases, it is also possible to provide only one hole which is worked application-specific into the crossbeam to preset the angle of tilt.

It will be understood that the above description of the present invention is susceptible to various modifications, changes and adaptations, and the same are intended to be comprehended within the meaning and range of equivalents of the appended claims.

The invention claimed is:

1. A support structure for a solar module, comprising:
an arrangement of posts mountable on a base;
a carrier unit for supporting the solar module and being pivotally positioned on each post, the carrier unit including a crossbeam and two struts supporting the crossbeam;
a pivot bearing, defining a pivot axis, in which the ends of said struts that face away from the crossbeam are positioned; and
a guide coupled to one of the posts, wherein the crossbeam is positioned displaceable with the aid of the guide, and wherein the guide includes a curved elongated opening in the crossbeam and a pin on the post guidable in the elongated curved opening to permit a continuously variable tilt angle or inclination of the solar module to be preset by adjusting and fixing a pivoting position of the carrier unit about the pivot axis of the pivot bearing.

2. The support structure according to claim 1, wherein one longitudinal-side end of a respective one of the struts is connected to a longitudinal-side end of the crossbeam.

3. The support structure according to claim 1, wherein the struts converge at an obtuse angle toward the pivot bearing.

4. The support structure according to claim 1, further including longitudinal members positioned on the crossbeam.

5. The support structure according to claim 4, wherein the longitudinal members are arranged to support the solar cell.

6. The support structure according to claim 4, further including a module carrier positioned on the longitudinal member and adapted to mount the solar module.

* * * * *